(12) United States Patent
An et al.

(10) Patent No.: US 12,388,331 B2
(45) Date of Patent: Aug. 12, 2025

(54) DRIVE AGGREGATE

(71) Applicant: Mahle International GmbH, Stuttgart (DE)

(72) Inventors: Dimitri An, Leutenbach (DE); Steffen Huebner, Leonberg (DE); Ivano Morgillo, Neuhuetten (DE); Johannes Weinmann, Stuttgart (DE)

(73) Assignee: Mahle International GmbH (DE)

( * ) Notice: Subject to any disclaimer, the term of this patent is extended or adjusted under 35 U.S.C. 154(b) by 261 days.

(21) Appl. No.: 17/558,583

(22) Filed: Dec. 21, 2021

(65) Prior Publication Data

US 2022/0200415 A1 Jun. 23, 2022

(30) Foreign Application Priority Data

Dec. 22, 2020 (DE) ..................... 10 2020 216 462.2

(51) Int. Cl.
| | |
|---|---|
| *H02K 11/33* | (2016.01) |
| *B01D 45/14* | (2006.01) |
| *F01M 13/04* | (2006.01) |
| *H02K 5/10* | (2006.01) |
| *H02K 5/22* | (2006.01) |

(52) U.S. Cl.
CPC ............. *H02K 11/33* (2016.01); *B01D 45/14* (2013.01); *F01M 13/04* (2013.01); *H02K 5/10* (2013.01); *H02K 5/225* (2013.01); *F01M 2013/0422* (2013.01); *H02K 2205/09* (2013.01); *H02K 2211/03* (2013.01)

(58) Field of Classification Search
CPC ....... H02K 5/10; H02K 11/33; H02K 2205/09
USPC ....................................................... 123/198 P
See application file for complete search history.

(56) References Cited

U.S. PATENT DOCUMENTS

| | | | |
|---|---|---|---|
| 1,331,089 A * | 2/1920 | Arthur ..................... | H01F 27/14 174/15.1 |
| 6,270,320 B1 * | 8/2001 | Heyder .................. | H02K 5/225 417/423.1 |

(Continued)

FOREIGN PATENT DOCUMENTS

| | | |
|---|---|---|
| CN | 206111612 U | 4/2017 |
| CN | 106660425 A | 5/2017 |

(Continued)

OTHER PUBLICATIONS

English abstract for DE-20 2016 008 314.

(Continued)

*Primary Examiner* — Logan M Kraft
*Assistant Examiner* — Joshua Campbell
(74) *Attorney, Agent, or Firm* — Fishman Stewart PLLC

(57) ABSTRACT

A drive aggregate may include an electric motor, a motor control for activating the electric motor, a housing, and a circuit board holder. The electric motor may include a rotor rotatable around an axis of rotation. The motor control may include a circuit board with a power electronics. The housing may include a base body receiving the electric motor and a cover receiving the motor control. The circuit board holder may support the circuit board and may be arranged axially between the base body and the cover. The base body and the cover may be composed of a metal. The circuit board holder may be composed of a plastic.

20 Claims, 3 Drawing Sheets

(56) References Cited

U.S. PATENT DOCUMENTS

| | | | |
|---|---|---|---|
| 7,367,328 B2 * | 5/2008 | Matsuda | F01M 13/021 123/198 C |
| 9,543,803 B2 | 1/2017 | Hoj et al. | |
| 2002/0060105 A1 * | 5/2002 | Tominaga | H02K 11/33 180/443 |
| 2006/0006094 A1 * | 1/2006 | Hofmann | H02K 29/08 206/706 |
| 2008/0252159 A1 * | 10/2008 | Huck | H02K 5/225 310/71 |
| 2008/0315692 A1 | 12/2008 | Beetz | |
| 2014/0030124 A1 * | 1/2014 | Hoj | F04D 13/0693 417/423.7 |
| 2015/0354575 A1 | 12/2015 | Olsen et al. | |
| 2016/0254719 A1 * | 9/2016 | Pondelek | F16H 61/0006 310/54 |
| 2016/0268875 A1 * | 9/2016 | Roos | H02K 5/10 |
| 2017/0133906 A1 | 5/2017 | Pfeiffer | |
| 2018/0030868 A1 * | 2/2018 | Elsaesser | F04D 29/706 |
| 2018/0238348 A1 * | 8/2018 | Pawellek | F04D 13/0693 |
| 2019/0063439 A1 * | 2/2019 | Diekmann | H02K 11/0094 |
| 2021/0340987 A1 | 11/2021 | Huebner et al. | |

FOREIGN PATENT DOCUMENTS

| | | | | |
|---|---|---|---|---|
| CN | 107453511 A | 12/2017 | | |
| CN | 109424554 A | 3/2019 | | |
| DE | 4240044 C2 * | 7/1997 | | H02K 5/10 |
| DE | 10 2005 062 021 A1 | 6/2007 | | |
| DE | 10 2015 219 149 A1 | 3/2017 | | |
| DE | 20 2016 008 314 U1 | 7/2017 | | |
| DE | 102016105656 A1 * | 10/2017 | | |
| DE | 102016209617 A1 * | 12/2017 | | |
| DE | 102017110489 A1 * | 11/2018 | | F02M 26/54 |
| DE | 10 2020 205 533 A1 | 11/2021 | | |
| EP | 1 622 241 A1 | 2/2006 | | |
| EP | 2 500 576 A1 | 9/2012 | | |
| EP | 2 529 839 A1 | 12/2012 | | |
| EP | 2 750 265 A1 | 7/2014 | | |

OTHER PUBLICATIONS

English abstract for DE-10 2017 110 489.
Chinese Search Report dated Jan. 24, 2024, CN202111559610.1 (w_English_translation).
Chinese Office Action dated Jan. 25, 2024, CN202111559610.1 (w_English_translation).
CN Office Action, CN202111559610.1, dated Jun. 4, 2024 (w-translation).
CN Search Report, CN202111559610.1, dated Jun. 1, 2024 (w-translation).

* cited by examiner

DRIVE AGGREGATE

CROSS-REFERENCE TO RELATED APPLICATIONS

This application claims priority to German Patent Application No. DE 10 2020 216 462.2, filed on Dec. 22, 2020, the contents of which is hereby incorporated by reference in its entirety.

TECHNICAL FIELD

The present invention relates to a drive aggregate. The invention additionally relates to a conveying means equipped with a drive aggregate of this type, as well as a separating means, which has a conveying means of this type as well as a separating aggregate. Lastly, the present invention relates to an internal combustion engine equipped with a separating means of this type.

BACKGROUND

A generic drive aggregate is known, for example, from DE 10 2020 205 533.5. A drive aggregate of this type has an electric motor, which has a rotor, which can be rotated around an axis of rotation. The drive aggregate further has a motor control, which has a circuit board comprising a power electronics, for activating the electric motor. The drive aggregate is further equipped with a housing, which has a base body receiving the electric motor and a cover covering the motor control. Lastly, the drive aggregate has a circuit board holder, which supports the circuit board and which is arranged axially between the base body and the cover.

Drive aggregates of this type can be used to drive a component, such as, e.g., a conveying aggregate, for conveying a fluid. In conjunction with a conveying aggregate of this type, a drive aggregate of this type can in particular be integrated to form a conveying means, which can be used, for example, in a crankcase breather of an internal combustion engine, in order to drive blowby gas. This may be required when the blowby gas has to be conveyed through an oil removal means, which has a comparatively how flow resistance.

Within a drive aggregate of this type, a comparatively high heat development occurs during the operation on the part of the electric motor. On the part of the motor control, heat is also generated during the operation, in particular in the region of the power electronics. Due to the fact that the electric motor generates significantly more waste heat than the motor control, it can be expedient to arrange electric motor and motor control separately and spaced apart from one another, in order to prevent a heat transfer from the electric motor to the motor control. This, however, is associated with an increased effort for the realization of the drive aggregate because a complex wiring or cabling, respectively, has to be provided. At the same time, this is routinely also associated with an increased installation space requirement.

The present invention deals with the problem of specifying an improved embodiment for a drive aggregate of the above-mentioned type or for a conveying means equipped therewith, respectively, or for an internal combustion engine equipped therewith, respectively, which is characterized in particular by a compact setup, while a largely thermal decoupling between electric motor and motor control is strived for at the same time.

A separating means is known from DE 10 2005 062 021 A1, in the case of which a separating aggregate in the form of a rotating centrifugal separator is coupled to a drive aggregate, in the case of which the electric motor and the motor control are arranged on a common housing.

Another separating means is known from DE 20 2016 008 314 U1. There, a separating aggregate, which is designed as rotating centrifugal separator, is again drivingly coupled to a drive aggregate. In the case of a first alternative, an electric motor rotationally drives external magnetic members, which, through a separating wall, rotationally drive internal magnetic members, which are connected in a rotationally fixed manner to a rotor of the centrifugal separator. In the case of a second alternative, the magnetic members form the electric motor, for the purpose of which the external magnetic members are activated to generate a rotating magnetic field, which drives the internal magnetic members and thus the rotor of the centrifugal separator.

A further separating means is known from EP 2 529 839 A1, in the case of which a separating aggregate, which is designed as rotating centrifugal separator, is drivingly coupled, in turn, to a drive aggregate. For this purpose, the rotor of the electric motor of the drive aggregate is directly connected in a rotationally fixed manner to the rotor of the centrifugal separator. The electric motor and the motor control are arranged in a common housing, which is flanged to a housing of the centrifugal separator.

SUMMARY

The above-mentioned problem is solved according to the invention by means of the subject matter of the independent claim(s). Advantageous embodiments are the subject matter of the dependent claim(s).

The invention is based on the general idea of dividing the housing into a base body receiving the electric motor and a cover covering the motor control, wherein a circuit board holder, which supports the circuit board comprising the power electronics, is arranged axially between the base body and the cover. Within the housing, the circuit board holder thus separates the electric motor from the motor control and nonetheless provides for a positioning of the motor control close to the electric motor, preferably on a side of the circuit board holder facing away from the electric motor. The invention furthermore proposes to make the base body and the cover of metal, and to make the circuit board holder of plastic. Metals, in particular light metals, preferably aluminum or aluminum alloys, respectively, or also magnesium or magnesium alloys, respectively, have a comparatively high coefficient of thermal conductivity and are thus suitable for dissipating the heat from the electric motor and from the motor control. Compared to this, plastics usually have a comparatively low coefficient of thermal conductivity, and thus provide for a thermal insulation. The coefficient of thermal conductivity of a plastic, which is suitable here, is usually approximately 100 times, but at least 50 times smaller than the coefficient of thermal conductivity of a metal, which is possible here. In the case of typical plastics, the coefficient of thermal conductivity is approximately 0.2 W/(m·K), while it is above 200 W/(m·K) in the case of aluminum. In other words, the circuit board holder is arranged between base body and cover as thermal insulator. Thermoplastics and thermosetting plastics can be suitable plastics. A reinforced thermoplastic is preferably used, in particular a glass fiber reinforced thermoplastic. In addition or in the alternative to glass fibers, other additives are also conceivable, such as, e.g., glass beads, talcum, and soot.

According to an advantageous embodiment, the electric motor can have several pin-like motor connections, which protrude axially in the direction of the cover, for activating the electric motor. The circuit board holder can have a separate passage opening for each motor connection, through which the respective motor connection extends. Due to this structural shape, a positioning of the circuit board holder close to the electric motor is promoted. According to an advantageous further development, the respective motor connection can be connected, in particular soldered, directly to a motor connection point of the power electronics, which is formed at the circuit board. According to this, the electric motor and the power electronics can be directly connected to one another through the circuit board holder, which provides for an extremely compact setup.

According to an advantageous further development, the base body can have a separate outlet opening for each motor connection, through which the respective motor connection extends axially. In other words, the base body has a separating wall, which extends transversely to the axial direction and which closes the interior space of the base body axially with respect to the cover. This separating wall provides for a thermal shielding of the electric motor with respect to the motor control. The outlet openings pass through this separating wall. For each motor connection, the base body can additionally have a connecting seal, which encloses the respective motor connection and closes the respective outlet opening. A liquid-tight and/or gas-tight seal is thereby realized between the motor connections and the base body. The respective connecting seal can advantageously be injection molded to the base body. This means that the respective connecting seal is connected comparatively firmly to the base body and has a duct for the respective motor connection. The respective connecting seal can thus in particular be designed as capillary seal.

According to an advantageous other embodiment, an outer motor seal can be formed axially between the circuit board holder and the base body, which revolves in a closed manner in the circumferential direction and which seals the circuit board holder with respect to the base body. By means of this outer motor seal, it is prevented that contaminations from the surrounding area of the housing get past the circuit board holder to the electric motor.

According to an advantageous embodiment, the outer motor seal can be designed as hardened liquid seal. In the present context, a "liquid seal" is understood to be a stable, highly viscous adhesive-based seal. A liquid seal of this type is applied in the desired dimension and geometry to one of the sealing partners as liquid in a metered manner and is subsequently hardened in its position of use, preferably when sealing partners are already mounted together. Liquid seals of this type can quasi compensate any roughness and allow for comparatively large manufacturing tolerances. It is noteworthy that the hardened liquid seal also still has a high elasticity. By means of the adhesive basis, the liquid seal can adhere to both sealing partners and can ensure an efficient, gap-free seal. Liquid seals can be designed as two-component systems and can be based, for example, on a silicon base or polyurethane base. Single-component systems are likewise conceivable, in the case of which the liquid seal is based, for example, on an acrylic base or acrylate base. In the case of the liquid seals, surface-dry alternatives can also be realized, which even allow for a disassembly of the sealing partners.

The outer motor seal designed as hardened liquid seal is thus characterized by a highly efficient sealing effect, whereby it can compensate comparatively high manufacturing tolerances at the same time. The outer motor seal is advantageously designed as surface seal, so that it operates with a large-area contact with respect to the circuit board holder and with respect to the base body.

In the case of another further development, it can be provided that the outer motor seal extends radially outside of the motor connections. In other words, the motor connections are located within the region, which is sealed with the help of the outer motor seal.

Another embodiment proposes that the base body has a passage opening coaxially to the axis of rotation, wherein an inner motor seal, which revolves in a closed manner in the circumferential direction around the passage opening and seals the circuit board holder with respect to the base body, is formed axially between the circuit board holder and the base body. An additional seal between the electric motor and the circuit board holder is realized with the help of the inner motor seal. This passage opening can be provided, for example, for the guide-through of a rotor shaft of the electric motor.

According to an advantageous further development, the inner motor seal can be designed as hardened liquid seal. The inner motor seal can thus be designed in the same way as the outer motor seal. The inner motor seal can in particular be designed as surface seal.

Another advantageous embodiment proposes that, axially between the circuit board holder and the cover, a cover seal is formed, which revolves in a closed manner in the circumferential direction and which seals the circuit board holder with respect to the cover. An embodiment is thereby particularly advantageous, in the case of which the cover seal is designed as separate sealing body, which is inserted into a sealing receptacle formed at the circuit board holder. The cover seal prevents contaminations in the surrounding area of the housing from getting to the motor control.

Another embodiment proposes that the circuit board holder has a holder base on a base body side facing the base body. This holder base extends essentially transversely to the longitudinal axis and effects the thermal shielding or thermal insulation, respectively, between base body and cover. On a cover side facing the cover, the circuit board holder can now have several holding elements, which protrude from the holder base and to which the circuit board is fastened spaced apart from the holder base. By means of this spaced-apart positioning of the circuit board with respect to the holder base, an air gap insulation is quasi realized between holder base and circuit board. In spite of the thermally insulating effect of the circuit board holder, the holder base, which is axially exposed directly to the base body, can heat up during the operation of the drive aggregate. By means of the distance between holder base and circuit board, this heat can get from the holder base to the circuit board essentially only via thermal radiation, whereby the heat input into the circuit board and thus into the power electronics is comparatively small.

According to another advantageous embodiment, the circuit board holder can have a pressure compensating means, which provides for a pressure compensation between an interior space of the cover and a surrounding area of the housing.

This pressure compensating means can advantageously have a membrane, which can be arranged radially within the cover seal. This membrane can be designed in a semi-permeable manner, so that it is permeable for gases, such as, e.g., air, whereas it is impermeable for liquids and solids. For example, this membrane can close or cover, respectively, a pressure compensating path, which is formed at the circuit board holder and which fluidically connects the surrounding area to the interior space of the cover.

The electric motor is preferably designed as brushless direct current motor, thus as BLDC motor.

A conveying means according to the invention is used to convey a fluid and is equipped with a drive aggregate of the above-described type. The conveying means is moreover equipped with a conveying aggregate, which can have, for example, a rotatable conveying wheel for conveying a fluid. The rotor of the electric motor of the conveying aggregate can be drivingly connected to the conveying wheel of the conveying aggregate, in particular coupled thereto in a rotationally fixed manner. A particularly compact structural shape is realized for the conveying means in this way.

An embodiment is preferred, in the case of which the conveying aggregate is designed as side duct compressor. A side duct compressor of this type is characterized by a compact setup and a high conveying capacity or compressor capacity, respectively. In the case of the side duct compressor, the conveying wheel has blades, which are arranged in a duct of the side duct compressor. In the case of a special embodiment, the duct can be axially divided into two duct halves. A particularly compact structural shape can be realized for the conveying means, when the one duct half is molded in the base body, while the other duct half is molded in a base of the housing, wherein the base is located at an end of the base body facing away from the cover, and represents a component, which is separately with respect to the base body.

A separating means according to the invention is used to separate liquid and/or solid contaminations from a gas stream, and is equipped with a conveying means of the above-mentioned type as well as with a separating aggregate for separating the liquid and/or solid contaminations from the gas stream. The separating aggregate is designed as static separating aggregate and forgoes movable, in particular rotatable, components. The separating aggregate thus has an extremely cost-efficient setup. The separating aggregate can in particular be designed as impactor. An impactor of this type is characterized by an extremely high separating effect. In the case of an impactor, the gas stream, which is loaded with contaminations, is deflected at an impact wall. The contaminations cannot follow this abrupt deflection. An impactor can in particular be equipped with nozzles, in order to additionally increase the flow speed in the gas stream, which significantly improves the separating effect. The separating aggregate, in particular an impactor of this type, therefore has a comparatively high flow resistance. By means of the conveying means, in particular in conjunction with the side duct compressor, sufficient pressure difference can be provided, in order to be able to realize a high separating effect.

An internal combustion engine according to the invention has a crankcase and a breather pipe, which discharges blowby gas from the crankcase. A separating means of the above-mentioned type, with the help of which oil and soot can be separated from the blowby gas, is arranged in this breather pipe.

Further important features and advantages of the invention follow from the subclaims, from the drawings, and from the corresponding figure description on the basis of the drawings.

It goes without saying that the above-mentioned features and the features, which will be described below, cannot only be used in the respective specified combination, but also in other combinations, or alone, without leaving the scope of the present invention. Above-mentioned parts and parts, which will be mentioned below, of a higher-level unit, such as, e.g., a means, a device, or an assembly, which are identified separately, can form separate parts or components, respectively, of this unit, or can be integral regions or portions, respectively, of this unit, even if this is illustrated differently in the drawings.

Preferred exemplary embodiments of the invention are illustrated in the drawings and will be described in more detail in the following description, whereby identical reference numerals refer to identical or similar or functionally identical components.

BRIEF DESCRIPTION OF THE DRAWINGS

In each case schematically.

DETAILED DESCRIPTION

Figure 1:
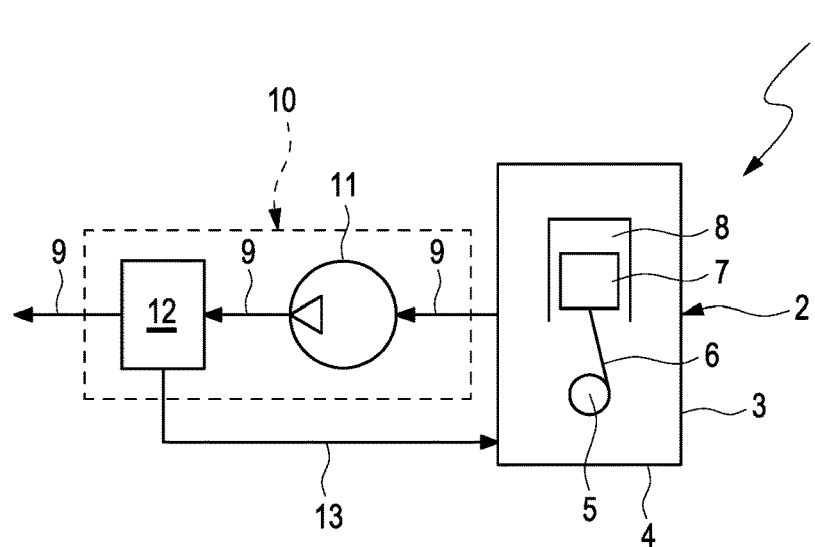
FIG. 1 shows a highly simplified, circuit diagram-like schematic diagram of an internal combustion engine.

According to FIG. 1, an internal combustion engine 1 in a motor block 2 comprises a crankcase 3, which can adjoin an oil pan 4 downwards. A crankshaft 5, which is connected via connecting rods 6 to pistons 7, which are arranged in cylinders 8 with stroke adjustability, rotates in the crankcase 3. The internal combustion engine 1 is equipped with a breather pipe 9, with the help of which blowby gas, which accumulates in the crankcase 3 during the operation of the internal combustion engine 1, can be discharged. A shielding means 10, which is suggested in FIG. 1 by means of a broken line, is arranged in this breather pipe 9. The separating means 10 is used to separate oil and soot from the blowby gas. For this purpose, the separating means 10 is equipped with a conveying means 11 for conveying or driving, respectively, the blowby gas, and with a separating aggregate 12, which is arranged downstream from the conveying means 11 in the breather pipe 9. The separating aggregate 12 is used to separate the oil and the soot particles from the blowby gas. Separated oil and separated soot particles can be fed to the oil pan 4 via a return line 13. The cleaned blowby gas can advantageously be fed to a fresh air tract of the internal combustion engine 1, which is not shown here and which supplies fresh air to the internal combustion engine 1.

Figure 2:
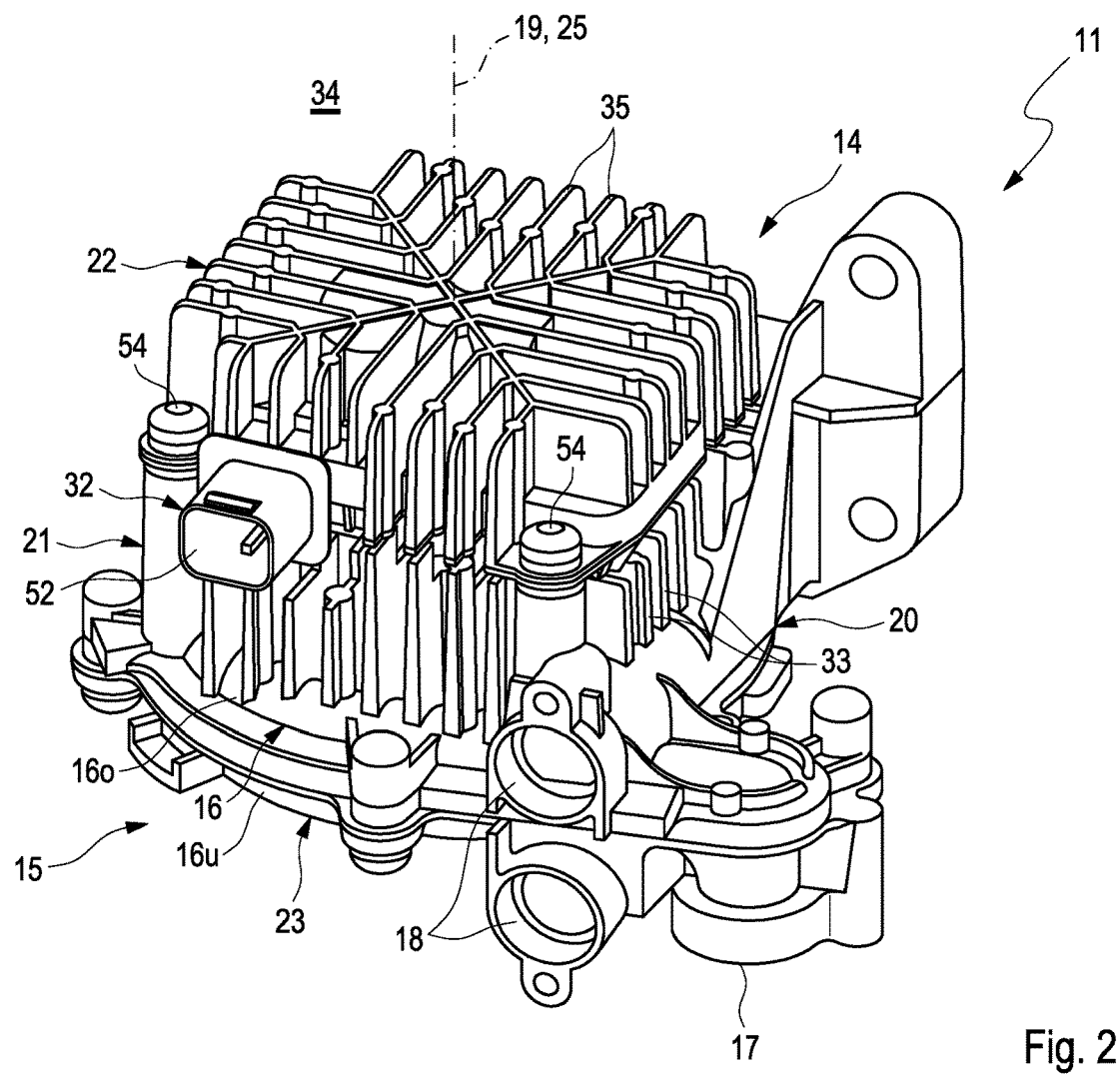
FIG. 2 shows an isometric view of a conveying means.

According to FIG. 2, the conveying means 11, which is used to convey the blowby gas or any other fluid, can be equipped with a drive aggregate 14, which is present in the upper region of the conveying means 11 in FIG. 2, and with a conveying aggregate 15, which lies in a lower region of the conveying means 11 in FIG. 2. The conveying aggregate 15 has a rotatable conveying wheel, which is not shown here, for conveying the fluid. The conveying aggregate 15 can advantageously be designed as side duct compressor, in the case of which blades of the conveying wheel are arranged in a duct 16, of which an inlet 17 and a two-piece outlet 18 can be seen in FIG. 2. In the example of FIG. 2, the duct 16 is divided with respect to a longitudinal axis 19 of the conveying means 11, so that it has an upper duct half 16o and a lower duct half 16u.

The drive aggregate 14 has a housing 20, which has a base body 21 and a cover 22. In the example of FIG. 2, the housing 20 moreover has, on a side facing away from the cover 22, a base 23, on which the lower duct half 16*u* is molded. The upper duct half 16*o*, in contrast, is molded on the base body 21. Base body 21, cover 22, and base 23, form separate component of the housing 20.

Figure 3:
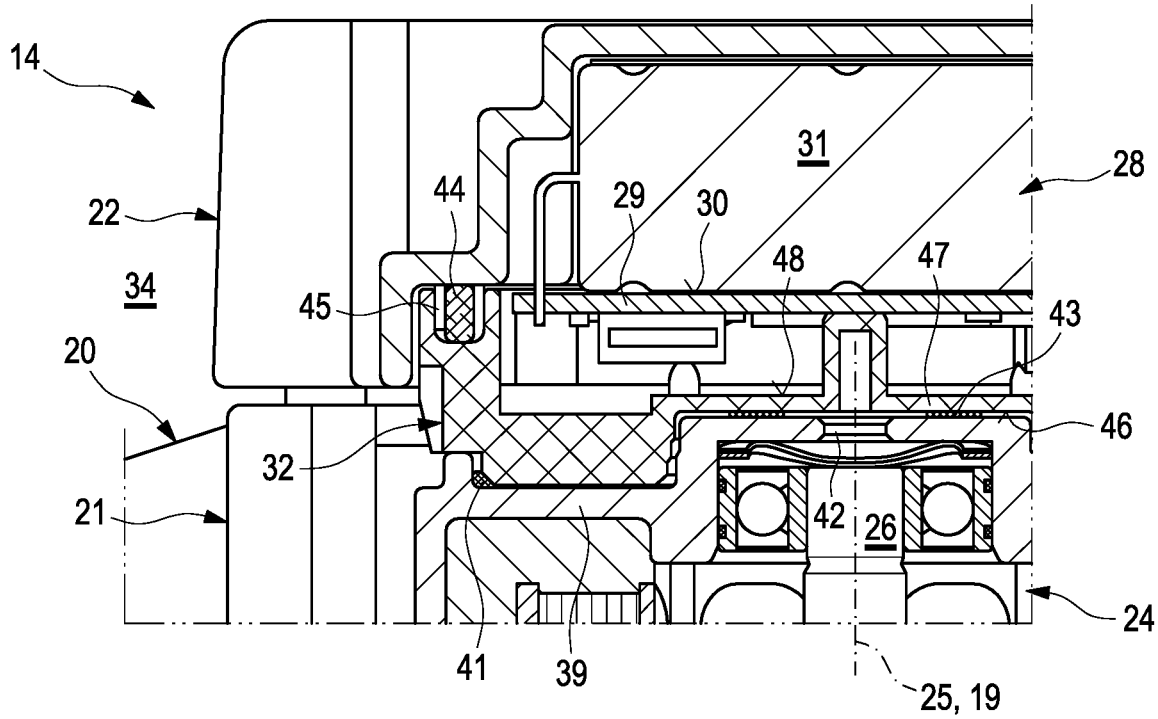
FIG. 3 shows a sectional view of the conveying means in the region of a drive aggregate.

According to FIG. 3, the drive aggregate 14 has an electric motor 24, which has a rotor 26, which can be rotated around an axis of rotation 25. The axis of rotation 25 defines the longitudinal axis 19 or the axial direction, respectively. The axial direction runs parallel to the axis of rotation 25. The radial direction runs transversely to the axial direction. The circumferential direction 27, which is suggested by means of a double arrow in FIGS. 4 and 5, runs around the axis of rotation 25.

The drive aggregate 14 moreover has a motor control 28 for activating the electric motor 24. The motor control 28 has a circuit board 29, which is equipped with a power electronics 30. In the sectional view of FIG. 3, a component 31 of this power electronics 30 can be seen in a cut manner. The base body 21 of the housing 20 receives the electric motor 24. The cover 22 of the housing 20 covers the motor control 28.

The drive aggregate 14 introduced here moreover has a circuit board holder 32, which is a separate component with respect to the base body 21 and the cover 22. The circuit board holder 32 support the circuit board 29 and is arranged axially between the base body 21 and the cover 22. For an advantageous heat balance of the drive aggregate 14, the base body 21 and the cover 22 are made of metal. In contrast, the circuit board holder 32 is made of plastic. The base body 21 can advantageously be equipped with cooling fins 33, in order to improve the heat transfer into a surrounding area 34 of the housing 20. The cover 22 can also be equipped with cooling fins 35, in order to improve the heat transfer into the surrounding area 34. During the operation of the drive aggregate 14, the base body 21 gives off waste heat of the electric motor 24 into the surrounding area 34. Waste heat of the motor control 28 is transferred from the cover 22 into the surrounding area 34. The circuit board holder 32 serves as thermal insulator and prevents the heat of the electric motor 24 from additionally heating up the motor control 28.

Figure 4:
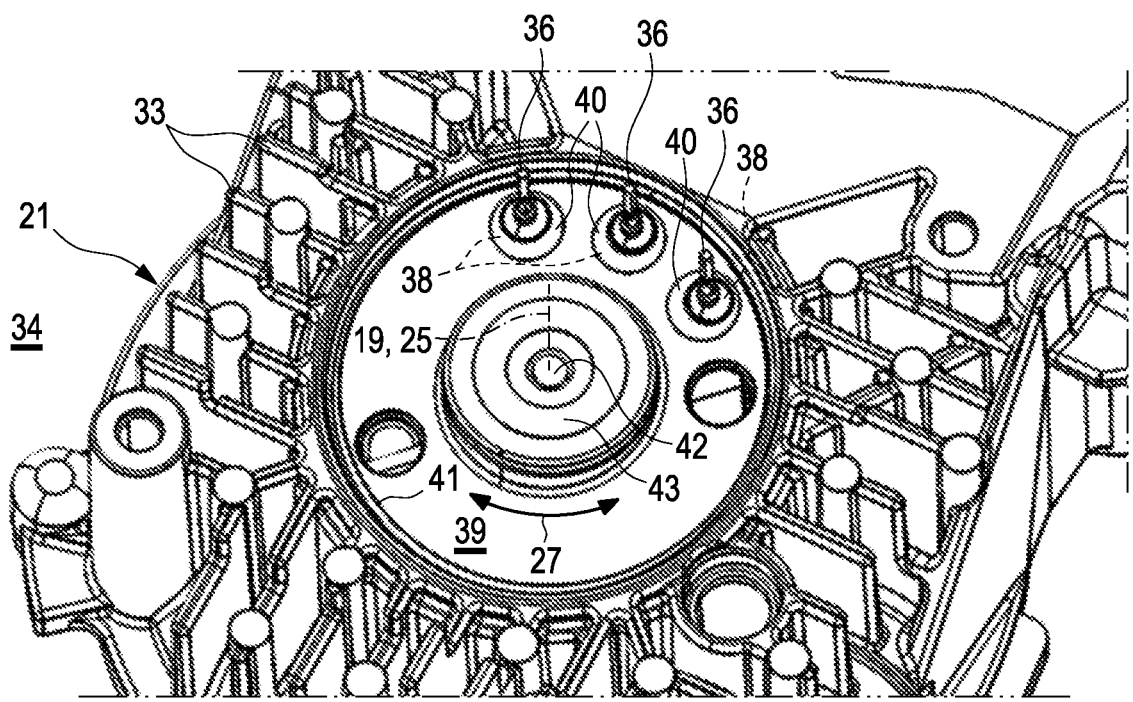
FIG. 4 shows an isometric view onto a base body of a housing of the drive aggregate.

According to FIG. 4, the electric motor 24 can have several pin-like motor connections 36, via which the electric motor 24 can be activated. The motor connections 36 extend parallel and/or axially and thereby protrude in the direction of the cover 22. According to FIG. 5, the circuit board holder 32 for each motor connection 36 can have a separate passage opening 37, through which the respective motor connection 36 extends axially. The respective motor connection 36 can in particular extend all the way to the circuit board 29 or even through corresponding circuit board openings, and can be electrically connected directly, preferably soldered, to the circuit board 29 by means of motor connection points of the power electronics 30 formed thereon. The motor control 28 is thus directly interconnected with the electric motor 24.

According to FIG. 4, the base body 21 can have a separate outlet opening 38 for each motor connection 36, through which the respective motor connection 36 extends axially. For axially closing the base body 21 on a side facing the cover 22, the base body 21 has a separating wall 39, which extends transversely to the longitudinal axis 19. The outlet openings 38 pass through this separating wall 39. For each motor connection 36, the base body 21 is now equipped with a connecting seal 40, which encloses the respective motor connection 36 and closes the respective outlet opening 38. The connecting seals 40 are advantageously injection molded to the base body 21. Depending on the assembly principle, it can also be provided that the connecting seals 40 are injection molded to the base body 21 and to the motor connections 36.

According to FIGS. 3 and 4, an outer motor seal 41, which revolves in a closed manner in the circumferential direction 27 and which seals the circuit board holder 32 with respect to the base body 21, can be arranged axially between the circuit board holder 32 and the base body 21. The outer motor seal 41 is advantageously designed as liquid seal. The outer motor seal 41 extends radially outside of the motor connections 36.

Coaxially to the longitudinal axis 19 or coaxially to the axis of rotation 25, respectively, the base body 21 has a central passage opening 42. In the assembled state of the drive aggregate 14, a rotor shaft, which is not shown here, of the rotor 26 of the electric motor 24 can protrude through this passage opening 42. An inner motor seal 43, which seals the circuit board holder 32 with respect to the base body 21, runs around this passage opening 42 in a closed manner in the circumferential direction 27. The inner motor seal 43 is advantageously also designed as liquid seal. The outer motor seal 41 and the inner motor seal 43 are thereby designed as surface seals. The design as liquid seal simplifies the production process, because a liquid seal of this type can compensate relatively large positional and production tolerances.

Figure 5:
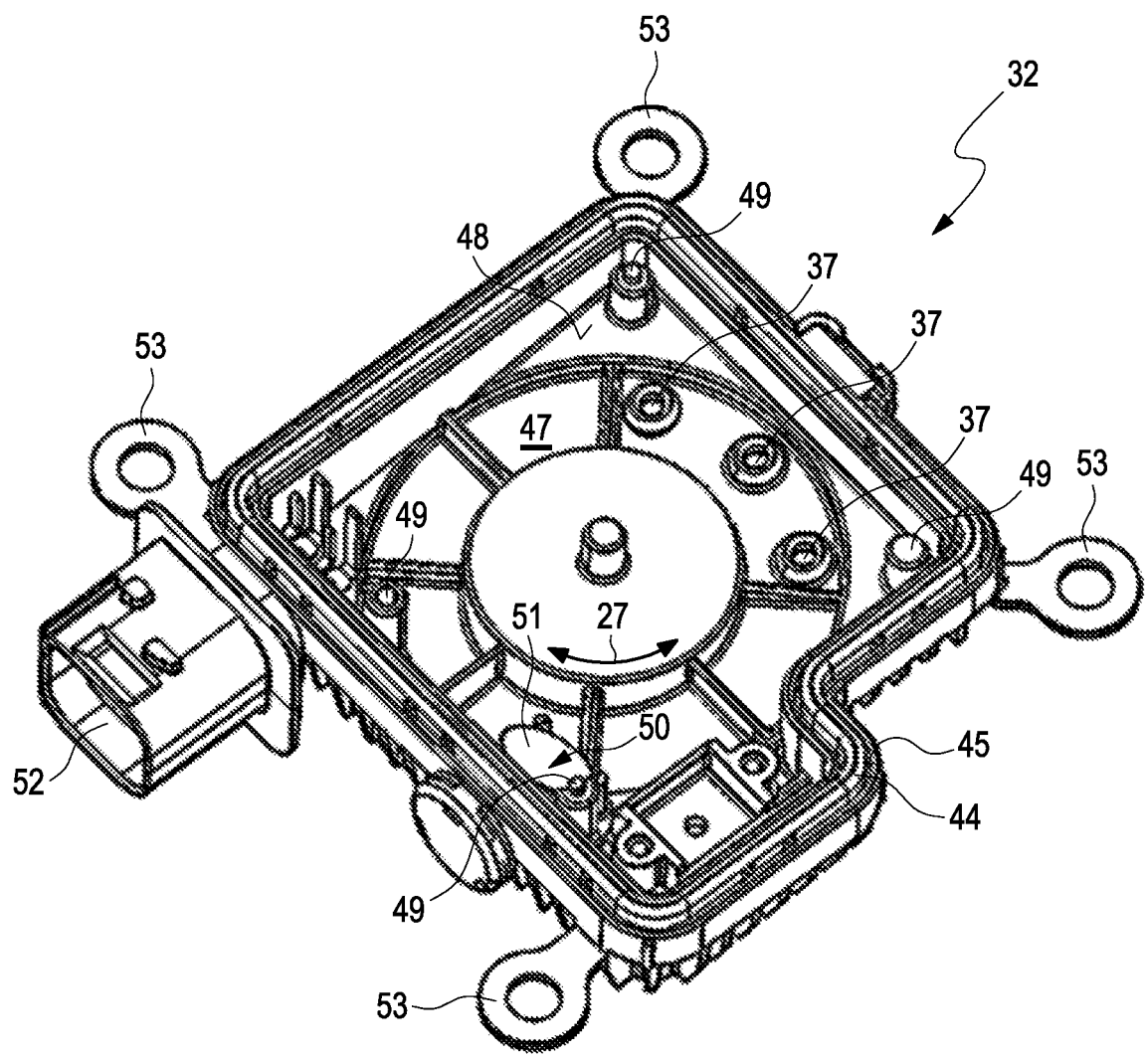
FIG. 5 shows an isometric view onto a circuit board holder of the drive aggregate.

According to FIGS. 3 and 5, a cover seal 44, which revolves in a closed manner in the circumferential direction 27 and which seals the circuit board holder 32 with respect to the cover 22, can be formed axially between the circuit board holder 32 and the cover 22. This cover seal 24 can now advantageously be designed as separate sealing body, which is inserted into a sealing receptacle 45, which is molded on the circuit board holder 32. The cover seal 44 encloses the motor control 28, which is covered by the cover 22, so that said motor control is protected against an ingress of dirt.

On a base body side 46, which faces away from the observer in FIG. 5 and which faces the base body 21, the circuit board holder 32 has a holder base 47, which acts like a thermal separating wall. The passage openings 37, which are mentioned further above, for the motor connections 36 are formed in this holder base 47. On a cover side 48, which faces the cover 22 and which faces the observer in FIG. 5, the circuit board holder 32 now has several holding elements 49, which protrude parallel and/or axially from the holder base 47 and to which the circuit board 29 is fastened so that it is spaced apart from the holder base 27.

According to FIG. 5, the circuit board holder 32 can have a pressure compensating means 50 radially within the cover seal 44. This pressure compensating means 50 provides for a pressure compensation between an interior space of the cover 22 and the surrounding area 34. For example, the pressure compensating means 50 can be equipped with a membrane 51, which closes a pressure compensating path, which cannot be seen here and which is permeable for gas and which is impermeable for liquid and solids. The pressure compensating path can be formed at or in the circuit board holder 32, can lead into the interior space of the cover 22 on the cover side 48 facing the cover 22, and can create a fluidic connection between the interior space of the cover 22 and the surrounding area 34. For example, this pressure compensating path between the holder base 47 and the sealing receptacle 45 can be guided through a wall of the circuit board holder 32, so that in the assembled state, the pressure compensating path leads into the surrounding area 34 so as to be protected between the cover 22 and the base body 21.

The circuit board holder 32 advantageously has an external electrical connection 52, which, in the assembled according to FIG. 2, is arranged on the outer side of the housing 20 and via which the motor control 28 can be connected to an electrical energy supply and/or to an external control device. The circuit board holder 32 can further have several tabs 53, which, in the assembled state according to FIG. 2, are integrated into screw connections 54, which secure the cover 22 to the base body 21. The circuit board holder 32 is thus secured between base body 21 and cover 22 at the same time.

The invention claimed is:

1. A drive aggregate, comprising:
    an electric motor including a rotor rotatable around an axis of rotation;
    a motor control for activating the electric motor, the motor control including a circuit board with a power electronics;
    a housing including a base body receiving the electric motor and a cover receiving the motor control;
    a circuit board holder directly supporting the circuit board and arranged axially between the base body and the cover;
    wherein the circuit board is at least one of connected to and mounted on the circuit board holder;
    wherein the base body of the housing includes a separating wall, a longest dimension of the separating wall extending transversely to the axis of rotation, the separating wall arranged axially between and separating the electric motor and the circuit board holder from one another;
    wherein the base body and the cover are composed of a metal; and
    wherein the circuit board holder is composed of a plastic.

2. The drive aggregate according to claim 1, wherein:
    the electric motor further includes a plurality of pin-like motor connections for activating the electric motor, the plurality of motor connections protruding axially in a direction of the cover;
    the circuit board holder includes a separate passage opening for each of the plurality of motor connections; and
    the plurality of motor connections each extend axially through the respective passage opening.

3. The drive aggregate according to claim 2, wherein:
    the base body includes a plurality of outlet openings disposed in and extending through the separating wall, the plurality of outlet openings including a separate outlet opening for each of the plurality of motor connections;
    each of the plurality of motor connections extend axially through the respective outlet opening; and
    the base body further includes a connecting seal for each of the plurality of motor connections, the connecting seal enclosing the respective motor connection and closing the respective outlet opening.

4. The drive aggregate according to claim 1, further comprising an outer motor seal arranged axially between the circuit board holder and the separating wall of the base body, the outer motor seal extending in a closed manner in a circumferential direction and sealing the circuit board holder with respect to the base body.

5. The drive aggregate according to claim 4, wherein:
    the electric motor further includes a plurality of pin-like motor connections for activating the electric motor, the plurality of motor connections protruding axially in a direction of the cover;
    the circuit board holder includes a separate passage opening for each of the plurality of motor connections;
    the plurality of motor connections each extend axially through the respective passage opening; and
    the outer motor seal extends radially outside of the plurality of motor connections.

6. The drive aggregate according to claim 1, further comprising an inner motor seal arranged axially between the circuit board holder and the separating wall of the base body, wherein:
    the separating wall of the base body includes a passage opening that extends coaxially to the axis of rotation; and
    the inner motor seal extends in a closed manner in a circumferential direction around the passage opening and seals the circuit board holder with respect to the base body.

7. The drive aggregate according to claim 1, further comprising a cover seal arranged axially between the circuit board holder and the cover, wherein:
    the cover seal extends in a closed manner in a circumferential direction and seals the circuit board holder with respect to the cover; and
    the cover seal is configured as a separate sealing body, which is inserted into a sealing receptacle of the circuit board holder.

8. The drive aggregate according to claim 1, wherein:
    the circuit board holder has a holder base disposed on a base body side facing the base body;
    the circuit board holder includes, on a cover side facing the cover, a plurality of holding elements that protrude from the holder base and to which the circuit board is fastened; and
    the circuit board is positioned and held spaced apart from the holder base via the plurality of holding elements such that an air gap is defined by and between the circuit board and the holder base.

9. The drive aggregate according to claim 8, wherein at least one of the plurality of holding elements has a surface that faces and directly contacts a surface of the circuit board facing the holder base.

10. The drive aggregate according to claim 1, wherein the circuit board holder includes a pressure compensating mechanism configured to provide a pressure compensation between an interior space of the cover and a surrounding area of the housing.

11. The drive aggregate according to claim 10, wherein the pressure compensating mechanism closes a pressure compensating path that extends through a wall of the circuit board holder and opens into a space disposed between the cover and the base body.

12. The drive aggregate according to claim 10, further comprising a cover seal, wherein the circuit board holder includes:
    a holder base disposed adjacent to the base body;
    a wall projecting from the holder base toward the cover;
    a sealing receptacle that is disposed in an end of the wall opposite the holder base, the cover seal disposed in the sealing receptacle and sealing the circuit board holder with respect to the cover; and
    a pressure compensating path extending through the wall and closed by the pressure compensating mechanism, the pressure compensating path disposed in a portion of the wall between the holder base and the sealing receptacle.

13. A conveyor for conveying a fluid, comprising:
a drive aggregate;
a conveying aggregate for conveying the fluid;
the drive aggregate drivingly connected to the conveying aggregate;
the drive aggregate including:
an electric motor including a rotor rotatable around an axis of rotation;
a motor control for activating the electric motor, the motor control including a circuit board with a power electronics;
a housing including a base body receiving the electric motor and a cover receiving the motor control; and
a circuit board holder supporting the circuit board and arranged axially between the base body and the cover;
wherein the electric motor further includes a plurality of pin-like motor connections for activating the electric motor, the plurality of motor connections protruding axially in a direction of the cover;
wherein the circuit board holder includes a separate passage opening for each of the plurality of motor connections;
wherein the plurality of motor connections each extend axially through the respective passage opening;
wherein the base body and the cover are composed of a metal; and
wherein the circuit board holder is composed of a plastic.

14. The conveyor according to claim 13, wherein the conveying aggregate is configured as a side duct compressor.

15. A separator for separating liquid and/or solid contaminations from a gas stream, comprising:
the conveyor according to claim 13;
a separating aggregate configured to separate at least one of liquid contaminations and solid contaminations from the gas stream; and
wherein the conveyor apparatus is configured to convey the gas stream to the separating aggregate.

16. An internal combustion engine, comprising:
a crankcase;
a breather pipe via which blowby gas is dischargeable from the crankcase; and
a separator arranged in the breather pipe, the separator configured to separate at least one of oil and soot from the blowby gas;
the separator including a conveyor and a separating aggregate;
the conveyor including a conveying aggregate and a drive aggregate drivingly connected to the conveying aggregate;
the drive aggregate including:
an electric motor including a rotor rotatable around an axis of rotation;
a motor control for activating the electric motor, the motor control including a circuit board with a power electronics;
a housing including a base body receiving the electric motor and a cover receiving the motor control;
a circuit board holder supporting the circuit board and arranged axially between the base body and the cover; and
a cover seal arranged axially between the circuit board holder and the cover;
wherein the cover seal extends in a closed manner in a circumferential direction and seals the circuit board holder with respect to the cover;
wherein the cover seal is configured as a separate sealing body, which is inserted into a sealing receptacle of the circuit board holder;
wherein the base body and the cover are composed of a metal; and
wherein the circuit board holder is composed of a plastic.

17. The internal combustion engine according to claim 16, wherein:
the electric motor further includes a plurality of pin-like motor connections for activating the electric motor;
the circuit board holder includes a separate passage opening for each of the plurality of motor connections;
the base body includes a separate outlet opening for each of the plurality of motor connections; and
the plurality of motor connections protrude axially in a direction of the cover and each extends axially through the respective passage opening and the respective outlet opening.

18. The internal combustion engine according to claim 16, further comprising:
an outer motor seal arranged axially between the circuit board holder and the base body, the outer motor seal extending in a closed manner in a circumferential direction and sealing the circuit board holder with respect to the base body; and
an inner motor seal arranged axially between the circuit board holder and the base body;
wherein the base body includes a passage opening that extends coaxially to the axis of rotation;
wherein the rotor includes a rotor shaft that protrudes through the passage opening; and
wherein the inner motor seal extends in a closed manner in the circumferential direction around the passage opening and seals the circuit board holder with respect to the base body.

19. The internal combustion engine according to claim 16, wherein:
the circuit board holder has a holder base disposed on a base body side facing the base body; and
the circuit board holder includes, on a cover side facing the cover, a plurality of holding elements that protrude from the holder base and to which the circuit board is fastened spaced apart from the holder base.

20. The internal combustion engine according to claim 19, wherein the plurality of holding elements are configured as positioning protrusions on which the circuit board is arranged.

* * * * *